United States Patent [19]

Koslow

[11] 4,189,266

[45] Feb. 19, 1980

[54] ROTARY DRILL BIT FOR HAND-HELD POWER DRILLS

[76] Inventor: George Koslow, 28 Warren St., New York, N.Y. 10007

[21] Appl. No.: 822,326

[22] Filed: Aug. 5, 1977

Related U.S. Application Data

[63] Continuation-in-part of Ser. No. 601,387, Aug. 1, 1975, abandoned.

[51] Int. Cl.[2] .................... B23B 51/00; B23B 51/02; B23G 15/00

[52] U.S. Cl. .................................... 408/224; 408/228; 408/229; 408/230

[58] Field of Search ............... 408/223, 224, 225, 227, 408/228, 229, 230, 199

[56] References Cited

U.S. PATENT DOCUMENTS

| | | | |
|---|---|---|---|
| 158,958 | 1/1875 | McCrosson | 408/224 |
| 370,484 | 9/1887 | Latham | 408/225 |
| 716,557 | 12/1902 | Klingensmith | 408/224 X |
| 1,221,247 | 4/1917 | Traylor | 408/224 |
| 1,355,065 | 10/1920 | Simpson | 408/224 |
| 1,407,546 | 2/1922 | Joseph | 408/230 X |
| 1,418,485 | 6/1922 | Smith | 408/224 |
| 1,519,876 | 12/1924 | Phelps | 408/199 X |
| 1,647,395 | 11/1927 | Costello | 408/223 X |
| 2,237,901 | 4/1941 | Chun | 408/223 X |
| 2,358,077 | 9/1944 | Koett | 408/223 X |
| 2,396,335 | 3/1946 | Moller | 408/230 |
| 2,576,664 | 11/1951 | Berlien | 408/230 |
| 3,014,386 | 12/1961 | Kallio | 408/229 X |

FOREIGN PATENT DOCUMENTS

| | | | |
|---|---|---|---|
| 92349 | 3/1918 | Switzerland | 408/224 |
| 25718 | of 1914 | United Kingdom | 408/224 |
| 196529 | 4/1923 | United Kingdom | 408/223 |
| 519475 | 3/1940 | United Kingdom | 408/223 |
| 567448 | 2/1945 | United Kingdom | 408/223 |

*Primary Examiner*—Horace M. Culver
*Attorney, Agent, or Firm*—Robert E. Burns; Emmanuel J. Lobato; Bruce L. Adams

[57] ABSTRACT

A rotary drill bit for hand-held power drills comprises successively, a cutting section of progressively increasing diameter, a section of decreasing diameter and a shank portion for mounting the bit in a hand-held electric drill. The cutting section of the bit comprises a plurality of cutting edges disposed symetrically about the axis of rotation of the bit and extending rearwardly from the apex at an angle to the axis. The cutting edges have cutting portions and noncutting portions which are so-arranged that the cutting portions of one cutting edge cut selected diameters of a hole to be bored and cutting portions of another cutting edge cut other diameters of the hole whereby all cutting edges together cut all diameters of the hole. The sum of the lengths of the cutting portions of all of the cutting edges is approximately equal to the total length of one cutting edge so that the torque required to turn the bit is reduced. The cutting portions are disposed approximately to balance lateral forces on the bit during boring.

11 Claims, 8 Drawing Figures

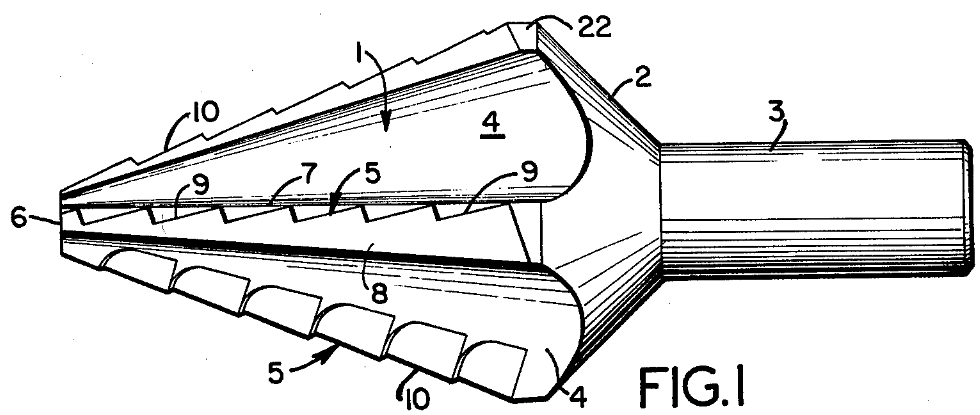
FIG. 1
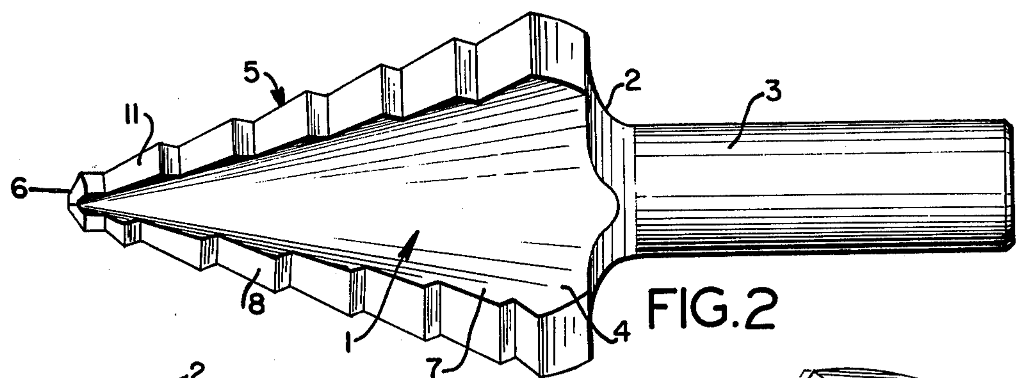
FIG. 2
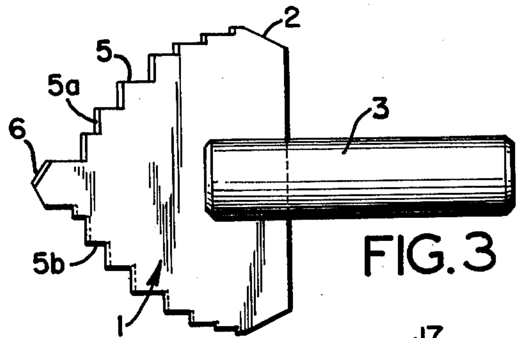
FIG. 3
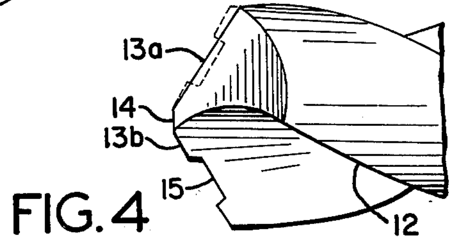
FIG. 4
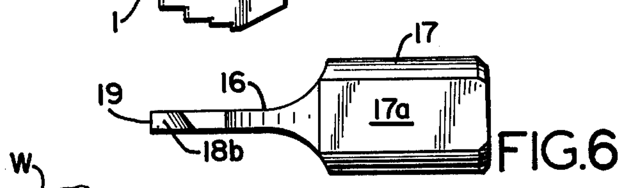
FIG. 6
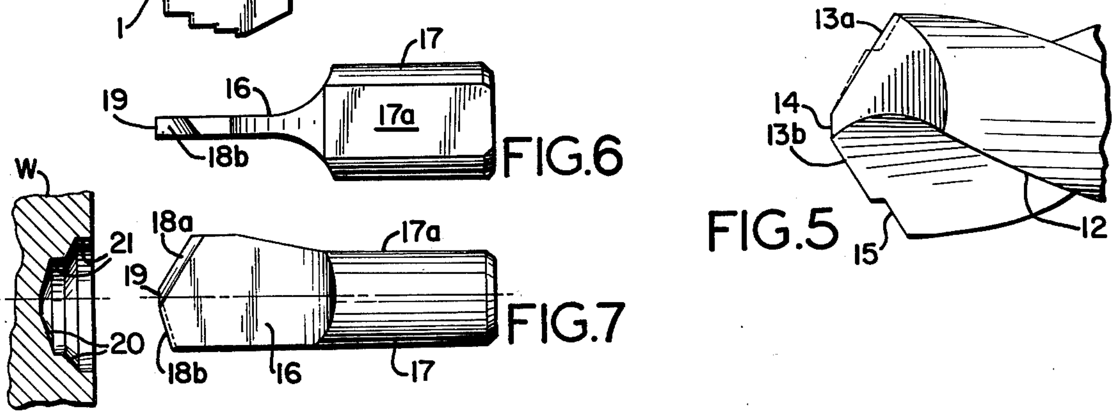
FIG. 5
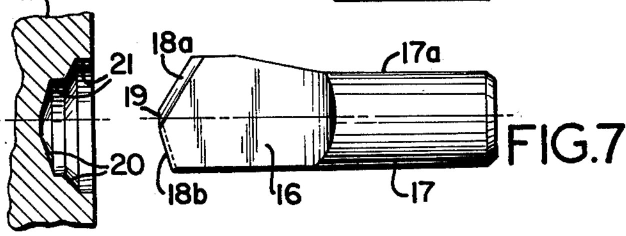
FIG. 7
FIG. 8

ROTARY DRILL BIT FOR HAND-HELD POWER DRILLS

REFERENCE TO PRIOR APPLICATION

This application is a continuation-in-part of my application, Ser. No. 601,387 filed Aug. 1, 1975, now abandoned.

FIELD OF INVENTION

The present invention relates to rotary drill bits for hand-held power tools such as electric drills and particularly to bits for drilling or enlarging holes in steel plates, structural iron or steel or other materials.

BACKGROUND OF THE INVENTION

Rotary drill bits are customarily provided with a plurality of cutting edges disposed symmetrically about the axis of rotation of the bit. The torque required to turn the bit during drilling is the torque required for each cutting edge multiplied by the number of cutting edges. When drilling or enlarging holes in hard materials such as steel or iron, a high torque is required. This may result in overloading the motor by which the drill is driven.

It has also been proposed to provide a bit with a single cutting edge and an opposite rubbing surface for balancing the radial force on the cutting edge. However, the friction of the rubbing surface generates heat and represents a waste of energy.

It has been proposed to notch the cutting edges of drill bits, spade drills, counter bores, reamers, countersinks and the like to break up chip lengths and thereby aid in the removal of the chips particularly from deep machine-drilled holes. However, these notches have always represented a small percentage of the cutting edges and do not materially reduce the torque required to drive the drill bit.

SUMMARY OF THE INVENTION

It is an object of the present invention to reduce cutting pressures and torque and thereby increase the capacity of hand-held power drills. This is achieved by reducing the area of tool contact with the work to approximately the equivalent of one cutting edge and by distributing segments of that edge around the axis of the bit so as to substantially balance the cutting forces and eliminate the friction generated by the rubbing portion of a conventional single flute drill bit. This is achieved by providing a plurality of cutting edges disposed symmetrically about the axis of rotation of the bit and providing the edges with cutting portions and noncutting portions so-arranged that cutting portions of one cutting edge cut selected diameters of a hole to be bored and cutting portions of another cutting edge cut other diameters of the hole whereby all cutting edges together cut all diameters of the hole. The sum of the lengths of the cutting portions of all of the cutting edges of the bit is approximately equal to the total length of one cutting edge whereby the torque required to turn the bit is reduced. Moreover, the cutting portions are so disposed as approximately to balance lateral forces on the bit without the use of rubbing surfaces.

The term "rotary drill bit" as used herein includes all multiple edge rotary hole working tools including those that are suitable solely for enlarging holes as well as those capable of starting a hole. Trepaners, reamers counterbores, countersinks and reverse chamfers for rod end chamfering, are also included.

The term "flute" as used herein includes right or left hand helical flutes, straight flutes, flat flutes, mixed, staggered, parallel, nonparallel, irregular or other flutes.

BRIEF DESCRIPTION OF DRAWINGS

The nature, objects and advantages of the invention will be more fully understood from the following description of preferred embodiments shown by way of example in the accompanying drawings, in which:

FIG. 1 is a side view of a 4-flute taper drill bit notched on forward faces of the cutting edges.

FIG. 2 is a side view of a 2-flute taper drill notched on the outside clearance or relief surfaces of the cutting edges.

FIG. 3 is a side view of a 2-flute curved bit with notches in the outside clearance surfaces.

FIGS. 4 and 5 are side views of the cutting end portions of twist drills, the ends of which have been ground asymmetrically and notched.

FIG. 6 is a side view of a flat drill bit which is eccentric and ground asymmetrically.

FIG. 7 is a side view taken at right angles to FIG. 6; and

FIG. 8 is a fragmentary cross-sectional view of a hole made by the bit shown in FIGS. 6 and 7.

DESCRIPTION OF PREFERRED EMBODIMENTS

In FIG. 1, there is shown a 4 -flute tapered drill bit having a cutting section 1 of increasing diameter, a section 2 of decreasing diameter and a shank 3 for mounting the bit in a power drill. The cutting section 1 of the drill bit has 4-flutes defining four cutting edges 5 which extend rearwardly from the apex 6 of the drill at an angle to the axis of rotation. As seen in FIG. 1, the included angle defined by the four cutting edges 5 is an acute angle. The cutting edges 5 are defined by the intersection of forward faces 7 provided by the flutes 4 and relieved clearance surfaces 8 providing a desired amount of relief. The preferred rake and clearance angles for cutting various materials are well known to those engaged in metal working, cutter sharpening, cutter design and manufacture.

In accordance with the invention, the forward faces of the cutting edges are notched to provide a plurality of notches 9. These notches are shown as being of saw-tooth shape but can take various shapes and can be produced by various metal working techniques well known to those skilled in the art of metal working including casting, powder compaction and grinding. The intersection of the notches 9 with the relieved clearance surfaces 8 produces cutting edges with a notched profile 10. The notches in each cutting edge are staggered in relation to those of the other cutting edges so that each cutting edge cuts bands of different diameters. For example, one cutting edge may cut the material between 21/32" and 11/16" diameter while another cutting edge may cut the material between 11/16" diameter and 23/32" diameter. By reason of the notching, each of the cutting edges is provided with cutting portions alternating with noncutting portions. Since each cutting edge cuts only the material left by the preceding cutting edges, there is little duplication of cutting even where each cutting portion is wider than necessary. The total of the lengths of the effective cutting portions of the four cutting edges is thus approximately equal to the total length of one cutting edge. The torque and pressure requirements are thereby reduced. Moreover, the cutting portions of the cutting edges are so distributed around the axis of the drill bit as to balance lateral forces so that the use of rubbing bearing surfaces is eliminated. A single flute bit can cut all diameters without duplication, but requires the use of an energy wasting bearing surface. By the present invention, the torque and pressure requirements are reduced to approximately those required for a single cutting edge but the use of rubbing bearing surfaces is avoided. At maximum diameter, the cutting means can be partially symmetrical for final hole sizing.

In FIG. 2, there is shown a 3-flute rotary drill bit when like the bit of FIG. 1, has a cutting section 1 of increasing diameter, a section 2 of decreasing diameter and a shank 3 for mounting the bit in the chuck of an electric drill. The cutting section of the drill but has three flutes 4 providing cutting edges 5 which extend rearwardly from a chisel point or apex 6 at an angle to the axis of rotation. As in FIG. 1 the included angle defined by the cutting edges is an acute angle. The cutting edges are defined by the intersection of forward faces 7 provided by the flutes 4 and relieved clearance surfaces 8 having suitable relief in accordance with metal working practice. Notches 11 are provided in the outside clearance surfaces 8 to divide the cutting edge into cutting portions and noncutting portions. As in the bit of FIG. 1, the notches in each cutting edge are staggered in relation to those of the other cutting edge so that each cutting edge cuts bands of different diameter. The total length of the effective cutting portions of the cutting edges is approximately equal to the total length of one cutting edge so that torque and pressure requirements are materially reduced. Moreover, as in the bit of FIG. 1, the effective cutting portions of the cutting edges are distributed about the axis of rotation so as approximately to balance radial forces and thereby avoid the need of rubbing bearing surfaces to keep the drill bit centered. With three or more flutes, flute spacing does not have to be equal. For example in a three flute drill the spacing may be 110°, 120° and 130° respectively. Moreover, the cutting edges may be unsymmetrically disposed.

In FIG. 3, there is shown a flat drill bit having a cutting section 1 of increasing diameter, a section 2 of decreasing diameter and a round shank 3 for mounting the bit in an electric drill. The cutting section of the drill bit has two cutting edges 5 which extend rearwardly from a chisel point or apex 6. The cutting edges are stepped so as to provide cutting portions 5*a* which are approximately perpendicular to the axis of rotation and non-cutting portions 5*b* which are approximately parallel to the axis. Each of the cutting portions 5*a* of the cutting edges is provided with appropriate clearance. The notches in the opposite cutting edges are staggered so that the cutting portions of one cutting edge cut bands of selected diameter while the cutting portions of the other cutting edge cut bands of other diameters. The cutting portions of the two cutting edges thus cut all diameters of the hole being bored. The sum of the lengths of the effective cutting portions of the cutting edges is approximately equal to the total length of one cutting edge.

It will be seen in FIG. 3 that the cutting edges have a general profile which is approximately semicircular so as to generate a roughly hemispherical step hole which like a ball and socket is more tolerant of movement and misalignment and has less tendency to bind. The optional starting end 6 is shown sharpened like a conventional twist drill. However, it can alternatively be sharpened as shown in FIGS. 4, 5 or 7.

FIGS. 4 and 5 shows the cutting ends of conventional twist drills which have been ground assymmetrically and notched to provide cutting portions and noncutting portions. The twist drills shown in FIGS. 4 and 5 have two flutes 12 and hence two cutting edges 13*a* and 13*b*, extending rearwardly from a chisel point or apex 14. The dotted lines show the outline of one cutting edge superimposed on the other so as to show the different diameters cut by each side. A rectangular notch 15 is provided in the cutting edge 13*b*. It will be seen that the cutting edge 13*a* is inclined at a lesser angle to the axis of the bit than the cutting edge 13*b* and hence cuts only material left by the cutting edge 13*b* by reason of the notch 15. Thus, except for little duplication near the web, the length of the cutting edge contact is reduced to nearly that of one cutting edge. Each side bores a different diameter and this is achieved with only one notch and with a reduced inclined angle on the opposite sides. Likewise, a bit as shown in FIGS. 1 or 2 can also be made with one or more unnotched cutting edges positioned so that they cut mostly material left by the interrupted or notched cutting edges. It will be understood that the bits of FIGS. 4 and 5 have sections of decreasing diameter and a suitable shank (not shown).

In FIGS. 6 and 7, there is shown a rotary drill bit having a flat cutting portion 16 and a round shank 17 which is flattened on one side as indicated at 17*a*. The cutting section 16 has cutting edges 18*a* and 18*b* extending rearwardly from a chisel point or apex 19. Each of the cutting edges is provided with suitable relief. As will be seen in FIG. 7, the point 18 is assymmetric with respect to the width of the blade forming the cutting section 16 so that the cutting edge 18*a* is longer than cutting edge 18*b*. However, cutting edge 18*a* is inclined at a lesser angle to the axis of the bit than the cutting edge 18*b* so that the cutting edge 18*a* cuts only material left by the shorter cutting edge 18*b*. Hence, only the outer portion of the edge 18*a* is an effective cutting portion. The bit thus works in much the same manner as that of FIG. 5. By reason of the flat side 17*a* of the shank 17, the drill is held in a three-jaw chuck of an electric drill so as to rotate about an axis extending through the point 19. Although the effective cutting portion of cutting edge 18*a*—i.e., its outer portion—is less than the effective cutting portion of the cutting edge 18*b*, it is located farther from the axis and hence the lateral portions have torque approximately balanced.

FIG. 8 illustrates schematically, how the respective cutting edges 18*a* and 18*b* of the bit shown in FIGS. 6 and 7 cut bands of different diameters in a workpiece W. By reason of its being inclined at a greater angle to the axis of rotation, the cutting edge 18*b* cuts bands 20 while the cutting edge 18*a* cuts bands 21. It will thus be seen that the effective cutting portions of the cutting edges are approximately equal in length to a single cutting edge but that together, the cutting edges cut all diameters within the hole being bored.

While preferred embodiments of the invention have been illustrated in the drawings and are herein particularly described, it will be understood that many variations and modifications may be made. Thus features of the several embodiments are interchangeable in so far as they are compatible. For example, the bit may have a short cylindrical section between the cutting section and the section of declining diameter 2 as illustrated at 22 in FIG. 1 to improve the finish of the hole and to permit resharpening of the bit without substantially changing the diameter. The invention is hence in no way limited to the illustrated embodiments.

What is claimed is:

1. A rotary metal-cutting drill bit for handheld power drills comprising successively a solid conical cutting section having a central apex and increasing in diameter rearwardly from said apex, the included angle of said conical cutting section being an acute angle, an integral adjoining section of decreasing diameter and an integral shank for mounting said drill bit in a handheld power drill, said shank being smaller than the maximum diameter of said cutting section, said cutting section having in its periphery at least three flutes of concave cross section extending rearwardly from said apex and increasing progressively rearwardly in width and depth, and cutting edges between said flutes, said cutting edges being defined by the intersection of forward faces formed by said flutes and relieved clearance surfaces, each of said cutting edges having inclined cutting portions alternating with noncutting portions regularly arranged with cutting portions of the respective cutting edges located at different distances from the axis of rotation of said bit so that, in drilling a hole in a metal workpiece, cutting portions of a first cutting edge cut portions of the metal, cutting portions of a second cutting edge cut portions of metal left by said first cutting edge and cutting portions of a third cutting edge cut portions of metal left by said second cutting edge, whereby all of said cutting edges together cut all diameters of said hole exclusive of any pilot hole, the sum of cutting portions of all of said cutting edges being approximately equal in length to the overall length of one cutting edge, whereby the pressure and torque required to operate said bit are reduced to the capability of handheld power tool usage, and said cutting portions of said cutting edges being disposed to balance lateral forces on said bit during drilling.

2. A rotary drill bit according to claim 1, in which said cutting portions of said cutting edges are straight.

3. A rotary drill bit according to claim 1, in which at the maximum diameter of said cutting section, cutting portions of said cutting edges are symmetrically arranged at the same distance from the axis of the bit for final hole sizing.

4. A rotary drill according to claim 1, in which said forward faces of said cutting edges are regularly notched to define said noncutting portions alternating with said cutting portions.

5. A rotary drill according to claim 4, in which said notched forward faces of said cutting edges are of saw tooth shape.

6. A rotary drill according to claim 1, in which said clearance surfaces of said cutting edges are regularly notched to define said noncutting portions alternating with said cutting portions.

7. A rotary drill according to claim 6, in which said notched clearance surfaces of said cutting edges are of saw tooth shape.

8. A rotary drill bit for handheld power drills comprising successively a cutting section of increasing diameter and a shank for mounting said bit in a handheld power drill, said cutting section having an apex concentric with the axis of rotation of said bit and comprising a plurality of cutting edges disposed about the axis of rotation of said bit and inclined radially outwardly and rearwardly from said apex of said bit, said cutting edges comprising two cutting edges which are of unequal length and are inclined at different angles to said axis of rotation, the longer of said two cutting edges being at a lesser angle to said axis of rotation, so that the longer of said two cutting edges cuts only material left uncut by the shorter of said two cutting edges, the sum of the lengths of cutting portions of the cutting edges of the bit being approximately equal to the total length of said longer cutting edge, whereby the pressure and the torque required to operate said bit are reduced to the capability of hand tool usage, and said cutting portions being disposed approximately to balance lateral forces on said bit during drilling.

9. A rotary drill bit for handheld power drills comprising successively a cutting section of increasing diameter, an adjoining section of decreasing diameter and a shank for mounting said bit in a handheld power drill, said shank being smaller than the maximum diameter of said cutting section, said cutting section comprising a plurality of cutting edges disposed about the axis of rotation of said bit and extending radially outwardly and rearwardly from an apex of said bit, said cutting edges having cutting portions and intervening non-cutting portions regularly arranged, with said cutting portions of the respective cutting edges located at different distances from said axis so that cutting portions of one cutting edge cut selected diameter of a hole to be drilled and cutting portions of another cutting edge cut other diameters of said hole, whereby all cutting edges together cut all diameters of said hole exclusive of any pilot hole, the sum of the lengths of the cutting portions of all of said cutting edges being approximately equal to the total length of one cutting edge, whereby the pressure and the torque required to operate said bit are reduced to the capability of hand tool usage and said cutting portions being disposed approximately to balance lateral forces on said bit during drilling, said cutting edges in contour being generally convexly arcuate so as to form an approximately hemispherical hole and thereby tolerate angular misalignment of said bit in the hole.

10. A rotary drill bit according to claim 9, in which said cutting portions of said cutting edges are straight.

11. A rotary metal-cutting drill bit for handheld power drills, comprising a cutting section having an apex concentric with the axis of rotation of said drill bit and a plurality of cutting edges inclined rearwardly and radially outwardly from said apex, said cutting edges comprising a first cutting edge which is notched to provide cutting and noncutting portions and a second cutting edge which is unnotched and is inclined at a lesser angle to the axis of rotation of said drill bit than said first cutting edge, whereby said second cutting edge cuts only material left by the noncutting portion of said first cutting edge, said cutting edges being disposed approximately to balance lateral forces on said bit during drilling.

* * * * *